(12) United States Patent
Ma et al.

(10) Patent No.: US 12,047,457 B2
(45) Date of Patent: Jul. 23, 2024

(54) SESSION PROCESSING METHOD AND APPARATUS, NETWORK DEVICE AND STORAGE MEDIUM

(71) Applicant: ZTE CORPORATION, Guangdong (CN)

(72) Inventors: Zijiang Ma, Guangdong (CN); Li Yang, Guangdong (CN); Yin Gao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 341 days.

(21) Appl. No.: 17/601,077

(22) PCT Filed: Mar. 12, 2020

(86) PCT No.: PCT/CN2020/078951
§ 371 (c)(1),
(2) Date: Oct. 3, 2021

(87) PCT Pub. No.: WO2020/199890
PCT Pub. Date: Oct. 8, 2020

(65) Prior Publication Data
US 2022/0166838 A1    May 26, 2022

(30) Foreign Application Priority Data
Apr. 3, 2019 (CN) .......................... 201910267452.9

(51) Int. Cl.
*H04L 67/141* (2022.01)
*H04W 76/10* (2018.01)
*H04W 84/04* (2009.01)

(52) U.S. Cl.
CPC .......... *H04L 67/141* (2013.01); *H04W 76/10* (2018.02); *H04W 84/045* (2013.01)

(58) Field of Classification Search
CPC .... H04L 67/141; H04W 76/10; H04W 84/045
See application file for complete search history.

(56) References Cited

U.S. PATENT DOCUMENTS 11,172,436 B2 * 11/2021 Casati ................. H04W 64/006
2018/0234876 A1 * 8/2018 Jheng .................... H04W 28/26
(Continued)

FOREIGN PATENT DOCUMENTS

| CN | 108668381 A | 10/2018 |
| CN | 108810903 A | 11/2018 |

(Continued)

OTHER PUBLICATIONS

WIPO, International Search Report issued on Jun. 2, 2020.
(Continued)

*Primary Examiner* — Won Tae C Kim
(74) *Attorney, Agent, or Firm* — Li & Cai Intellectual Property (USA) Office

(57) ABSTRACT

The present application provides a session processing method and apparatus, a network device and a storage medium. The session processing method includes: receiving, by a distributed node, a session processing request message from a central node, the session processing request message including information of a partial session to be processed in the distributed node, and the central node being connected to multiple distributed nodes; and processing the partial session with a UE by the distributed node receiving the session processing request message according to the information of the partial session to be processed.

20 Claims, 11 Drawing Sheets receive, by a distributed node, a session processing request message from a central node, the session processing request message including information of a partial session to be processed in the distributed node — S11 process the partial session with a UE by the distributed node receiving the session processing request message according to the information of the partial session to be processed — S12

(56) References Cited

U.S. PATENT DOCUMENTS

2019/0335366 A1* 10/2019 Jin .................... H04W 36/0033
2021/0315029 A1* 10/2021 Shi ...................... H04W 68/005
2022/0022089 A1*  1/2022 Zhu .................. H04W 28/0268

FOREIGN PATENT DOCUMENTS

| CN | 110536478 A    | 12/2019 |
|----|----------------|---------|
| EP | 3567877 B1     | 6/2021  |
| EP | 4007367 A1     | 6/2022  |
| WO | 2013174335 A2  | 11/2013 |
| WO | 2019029674 A1  | 2/2019  |

OTHER PUBLICATIONS

European Patent Office, The extended European search report issued Nov. 25, 2022 for application No. EP20781877.4.
"3rd Generation Partnership Project; technical specification group radio access network; NG-RAN; Xn application protocol (XnAP) (Release 15)", 3GPP Draft, Mar. 27, 2019.

* cited by examiner

SESSION PROCESSING METHOD AND APPARATUS, NETWORK DEVICE AND STORAGE MEDIUM

CROSS-REFERENCE TO RELATED APPLICATION

The present application claims priority to the Chinese patent application No. 201910267452.9, filed with the China Patent Office on Apr. 3, 2019, the entire contents of which are incorporated in the present application by reference.

TECHNICAL FIELD

The present application relates to the field of communications, and for example, relates to a session processing method and apparatus, a network device and a storage medium.

BACKGROUND

The 3rd Generation Partnership Project (3GPP) 4 Generation (4G) or Long Term Evolution (LTE) cellular mobile communication system includes: a 4G Evolved Packet Core (EPC) and a Radio Access Network (RAN). The 4G EPC includes basic network element nodes such as a Mobility Management Entity (MME) node, a Serving Gateway (SGW) node, and a PDN Gateway (PGW) node. The 4G RAN includes an evolved Node B (eNB) and interfaces between multiple base stations.

The 5th Generation terrestrial 5G cellular mobile communication system after 4G includes a 5 Generation Core (5GC) and a Next Generation Radio Access Network (NG-RAN). The 5GC includes network element nodes such as an Access Mobility Function (AMF) node, a Session Management Function (SMF) node, and a User Plane Function (UPF) node. The NG-RAN includes at least two different Radio Access Technology (RAT) types of base stations, namely: ng-eNB, which is continuously enhanced and evolved based on 4G eNB, and gNB, which is designed with a physical layer brand new air interface. Also included in NG-RAN is an interface between the base station and the relevant network element entity. The ng-eNB air interface still supports evolved Universal Terrestrial Radio Access (E-UTRA) RAT, while the gNB air interface supports New Radio (NR) RAT.

When the user equipment (UE) is connected to multiple base stations of the access network for data transmission, it needs to rely on an interface between a master node and the core network and an Xn interface between master and secondary nodes to perform interaction of various information related to dual/multiple connectivity operations. However, in some cases, the Xn interface connection is not fixed and has relatively low robustness, which can easily cause situations such as unstable multiple connectivity or incapability of being configured or operated.

SUMMARY

In order to solve at least one of the above technical problems, embodiments of the present application provide the following solutions.

An embodiment of the present application provides a session processing method, including: receiving, by a distributed node, a session processing request message from a central node, the session processing request message including information of a partial session to be processed in the distributed node, and the central node being connected to multiple distributed nodes; and processing the partial session with a user equipment (UE) by the distributed node receiving the session processing request message according to the information of the partial session to be processed.

An embodiment of the present application provides a session processing method, including: sending, by a central node, a session processing request message to a distributed node, the session processing request message including information of a partial session to be processed in the distributed node, and the central node being connected to multiple distributed nodes; wherein the session processing request message is configured to instruct the distributed node receiving the session processing request message to process the partial session with a UE according to the information of the partial session to be processed.

An embodiment of the present application provides a session processing apparatus, including: a first receiving module configured to receive a session processing request message from a central node, wherein the session processing request message including information of a partial session to be processed in the distributed node, and the central node being connected to multiple distributed nodes; and a processing module configured to process the partial session with a UE according to the information of the partial session to be processed.

An embodiment of the present application provides a session processing apparatus, including: a first sending module configured to send a session processing request message to a distributed node, the session processing request message including information of a partial session to be processed in the distributed node, and the central node being connected to multiple distributed nodes; wherein the session processing request message is configured to instruct the distributed node receiving the session processing request message to process the partial session with a UE according to the information of the partial session to be processed.

An embodiment of the present application provides a network device, including: a processor and a memory; wherein the memory is configured to store instructions; and the processor is configured to read the instructions to implement the method according to any one of the embodiments of the present application.

An embodiment of the present application provides a storage medium having a computer program stored thereon which, when executed by a processor, cause the method according to any of the embodiments of the present application to be implemented.

According to the embodiments of the present application, partial sessions in distributed nodes can be processed by means of a central node, so as to perform centralized control on sessions in the distributed nodes, and thus facilitate improvement in the flexibility of multiple connectivity operations.

DETAILED DESCRIPTION

For clarity and better understanding of the objects, technical solution and advantages of the application, embodiments of the present application will now be described in detail in conjunction with the accompanying drawings. It should be noted that the embodiments of the application and features therein may be combined with each other in any manner as long as they are not contradictory.

Figure 1:
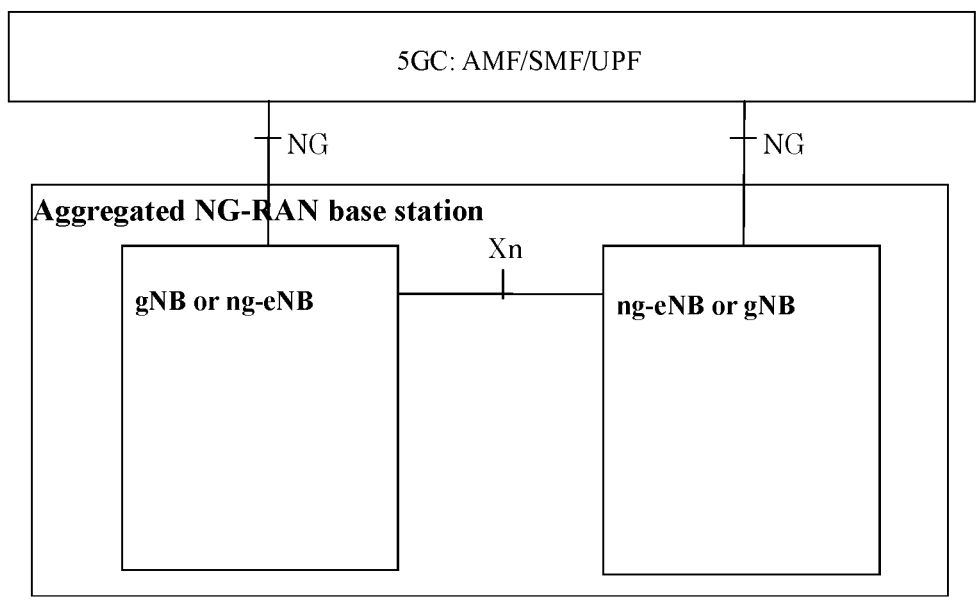
FIG. 1 is an architecture diagram of an aggregated NG-RAN base station.

FIG. 1 is an architecture diagram of an aggregated NG-RAN base station. As shown in FIG. 1, multiple NG-RAN base stations (e.g., gNBs or NG-eNBs, etc.) are connected to 5GC via standardized NG interfaces, including, for example, NG-C control plane (signaling) connection and NG-U user plane (user data) connection. NG-RAN base stations (gNBs or NG-eNBs) are connected with each other via Xn interfaces (including Xn-C control plane connection and Xn-U user plane connection). The control plane connection of the above interfaces is configured to transmit control signaling messages between network element nodes, such as Next Generation Application Protocol (NGAP) and XnAP Protocol flow messages. The user plane connection is configured to transmit user service data (packets/frames/blocks) and the like. NGAP and XnAP are respectively NG-C, Xn-C control plane logic network application layer protocols, and transmit control signaling process messages on corresponding interfaces based on lower layer bearer transmission (SCTP (Stream Control Transmission Protocol) connection). The user plane interfaces NG-U and Xn-U receive user service data, and transmit the user service data on corresponding interfaces based on lower layer bearer transmission (e.g., GTP-U tunnels). The NG-RAN base station and the served user equipment (UE) are connected to each other via a Uu air interface (i.e., a radio air interface). The Uu air interface includes control plane signaling radio bearers (SRBs) of multiple air interfaces and user plane data radio bearers (DRBs) of multiple air interfaces.

Figure 2:
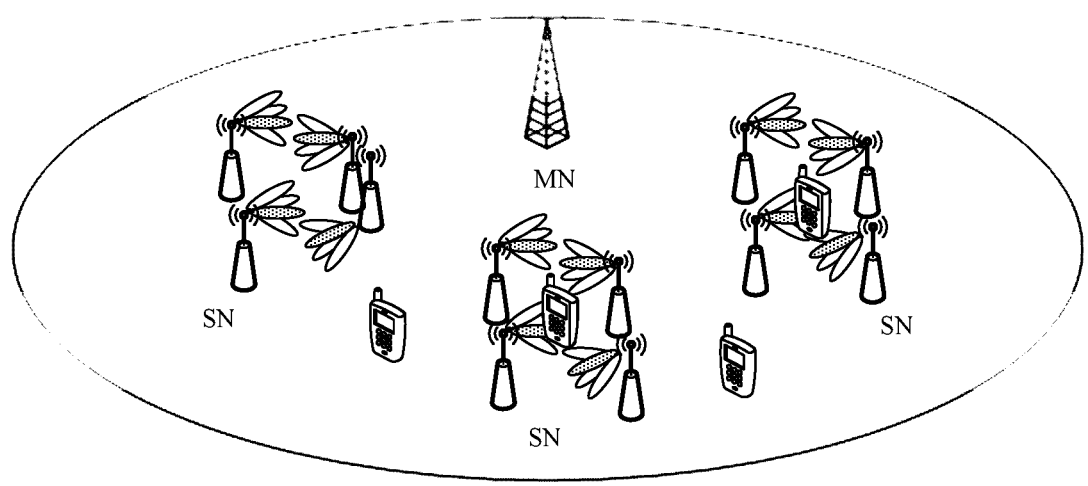
FIG. 2 is a schematic diagram of a heterogeneous network deployed by macro and micro cells of different RAT standards.

In conventional land-based terrestrial cellular mobile systems, the deployment of various base stations, once the sites thereof are determined, is relatively static and stationary with respect to a physical location with particular longitude and latitude on the ground. Therefore, configuration and supply of the radio coverage/capacity of the Uu air interface serving cells provided by the respective NG-RAN base stations, as well as the NG and Xn interface instances connecting the neighboring NG-RAN base stations, and the like, are also fixed relative to the physical location. For example: the bearer transmission of interface connections such as NG and Xn is mostly achieved by fixed network transmission modes such as broadband optical fibers. Therefore, the robustness, latency, signaling and data transmission efficiency of the network side interface connection are better. Such a relatively static and stationary land-based terrestrial cellular mobile network is convenient for planning and deployment as well as radio resource management (RRM) by an operator. As shown in FIG. 2, in a large hybrid heterogeneous network deployed with micro and macro serving cells, there may be various types of base stations of different RAT standards, different carrier frequency points, different working bandwidths, and different radio coverage capabilities, such as 4G legacy eNBs, 5G gNBs, ng-eNBs, Wireless Local Area Networks Access Points (WLAN APs), and/or other network element nodes, which can perform interactive operations with each other.

Figure 3:
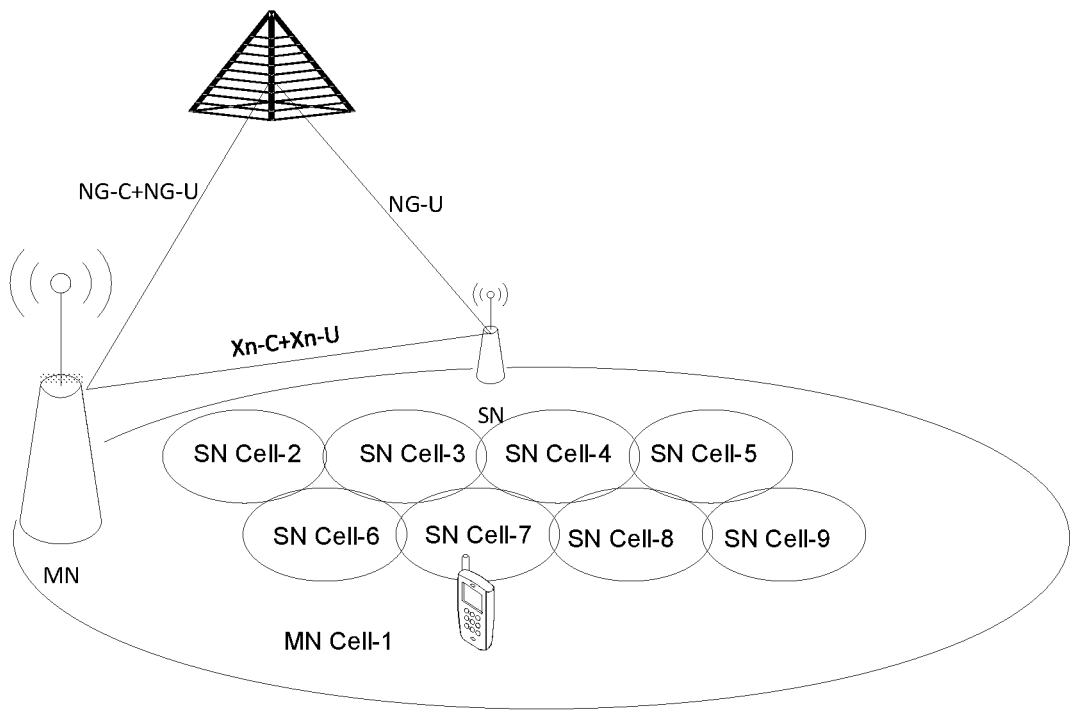
FIG. 3 is a schematic diagram illustrating a dual connectivity operation of a MN master control UE.

The 5G system supports the UE in a single connectivity (SC) operating mode and a dual/multiple connectivity (DC/MC) operating mode. MC is a logical dimension extension of DC, and DC will be mainly described below. In the SC operating mode, the UE has only one signaling or data transmission channel, called radio link (RL), at the Uu air interface and network side. In the DC/MC operating mode, the UE has two or more signaling or data transmission channels, i.e., multiple relatively independent RLs, at the air interface and network side. Under the Radio Resource Control (RRC) of a master node at an NG-RAN master control anchor, SRBs and DRBs of multiple air interfaces can be configured and used on the dual/multiple RLs. As shown in FIG. 3, a master node (MN) is typically used to provide radio macro coverage within a particular physical area. In local hot spots or areas with weak coverage, multiple secondary nodes (SNs) are configured to provide enhanced radio micro-coverage to improve the overall radio capacity and performance of the heterogeneous cellular network.

Figure 4A:
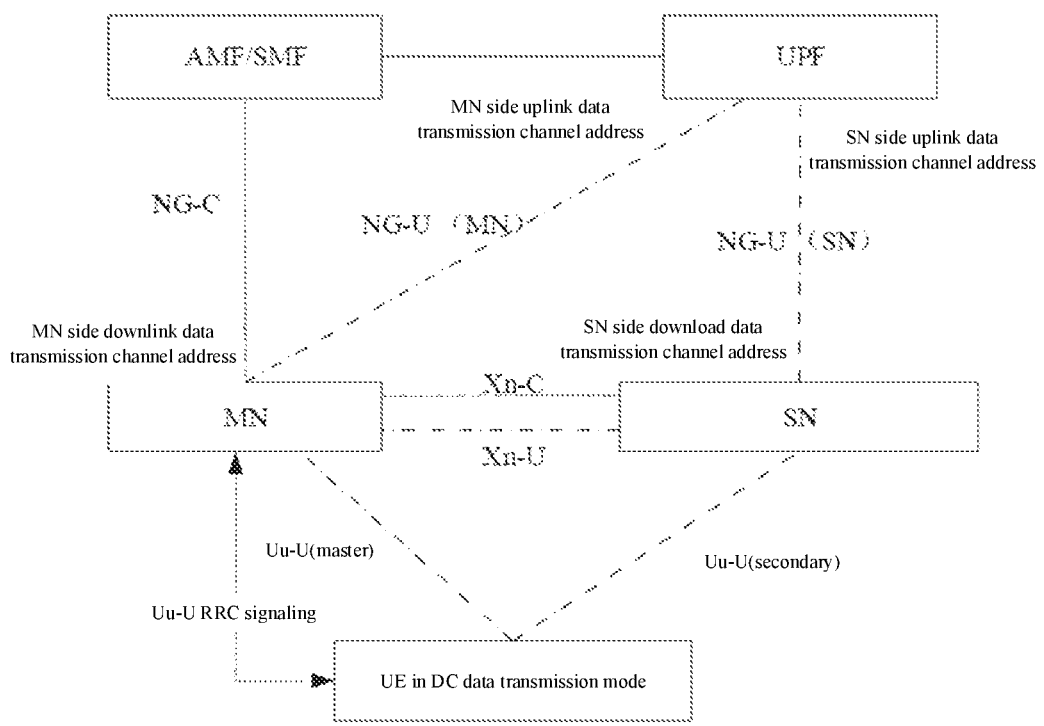
FIGS. 4a and 4b are schematic diagrams of a UE in a dual connectivity mode.
Figure 4B:
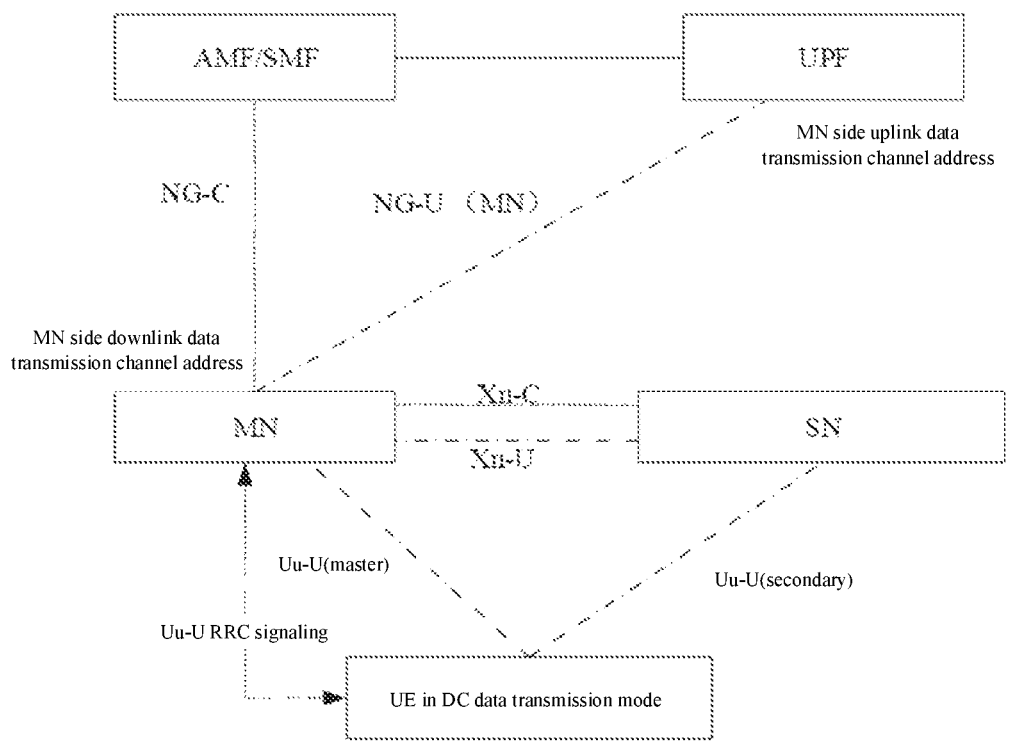

Taking a multi-radio dual connectivity (MR-DC) operating mode supported by a 5G related protocol as an example, for a specific UE, when the UE is within an overlapping coverage area of an MN primary serving cell and an SN secondary serving cell and under the master control of the master node MN, there will be NG-C and NG-U interface connection between MN and 5GC, Xn-C and Xn-U interface connection between MN and SN, but only NG-U connection between SN and 5GC. Therefore, the entering, exiting and all basic operations of the UE in the dual connectivity operating mode are completed by the master control of the master node MN. Based on an RRM measurement report of the UE regarding constantly changed radio conditions of the air interface, and local RRM algorithm conditions of the master node MN itself, the master node MN performs master control and decision on the dual connectivity configuration, operating state, wireless transmission, resource coordination and the like between MN and 5GC, SN or UE. Most control plane operations between SN and 5GC or UE are completed through the Xn-C interface connection and forwarding by MN. In FIGS. 4a and 4b, the control plane connection between network element nodes are indicated by dashed lines, and the user plane connection between network element nodes are indicated by dash-dot lines. FIG. 4a shows an SN Terminated bearer type that is focused between a network element node MN/SN and a UPF node ("UPF" for short), and there are two NG-U interface data transmission channels. The first channel is a data transmission channel between UPF and MN provided by NG-U(MN), which is configured to transmit uplink and downlink data packets carried on protocol data unit (PDU) sessions/QoS flows at the MN side. Creating this channel requires UPF to provide an "MN side uplink data transmission channel address" and MN to provide an "MN side downlink data transmission channel address". Likewise, the second channel is a data transmission channel between UPF and SN provided by NG-U(SN), which is configured to transmit uplink and downlink data packets carried on PDU sessions/QoS flows at the SN side. Creating this channel requires UPF to provide an "SN side uplink data transmission channel address" and SN to provide an "SN side downlink data transmission channel address". For the SN Terminated bearer type, there is no need to set up and maintain an Xn-U interface bearer between MN and SN, since each user service data flow occurs independently between UPF and the master and secondary nodes. FIG. 4b shows a MN Terminated bearer type focusing between MN and UPF, and having one NG-U interface data transmission channel, that is, a data transmission channel between UPF and MN provided by NG-U (MN). However, there is no NG-U interface data transmission channel between SN and UPF. In contrast to FIG. 4a, FIG. 4b does not have any NG-U (SN) channel. For the MN Terminated bearer type, in order to use the SN-side radio resources to assist transmission, an Xn-U bearer needs to be set up and maintained between MN and SN, since all user service data flows are required to occur between MN and SN. In short, the supported DC/MC operation must rely on the Xn-C interface between MN and SN, and the multiple master and secondary nodes participating in the DC/MC operation also rely on that to perform coordination and update of resource configuration and operating state with each other.

Figure 5A:
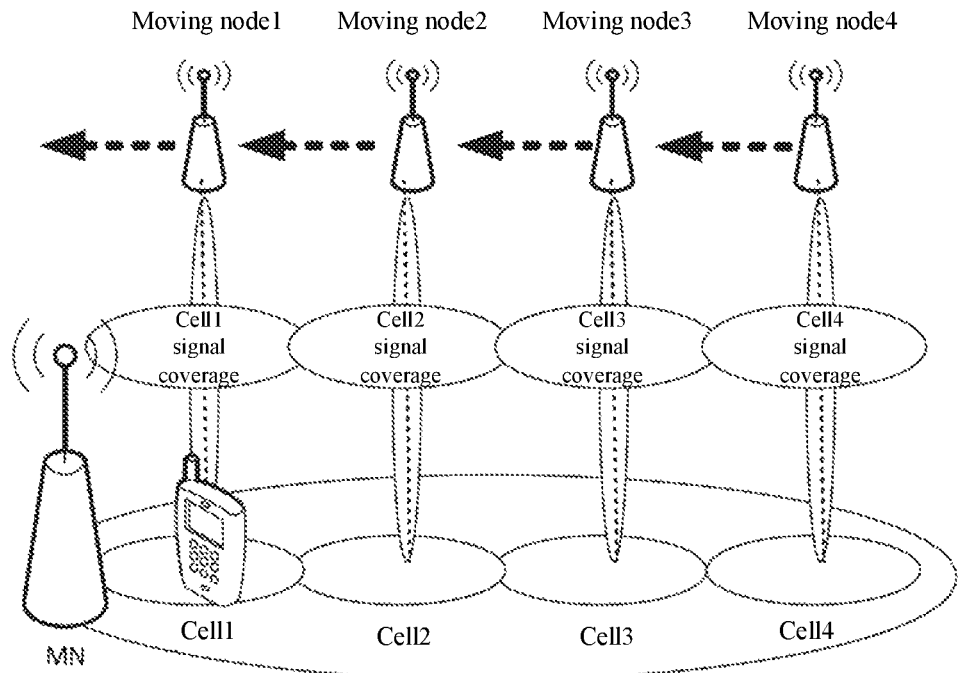
FIGS. 5a and 5b are schematic diagrams illustrating changes in coverage of serving cells of a satellite base station.
Figure 5B:
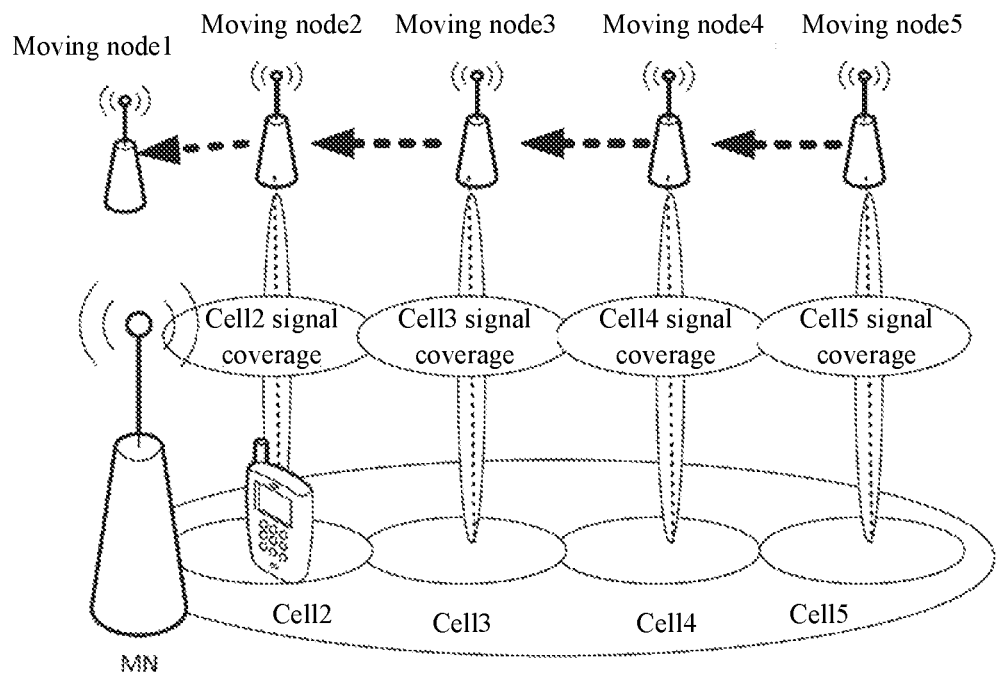

With the advent of various types of mobile base stations or network element nodes, such as terrestrial vehicle-mounted mobile base stations, airborne UAV base stations, satellite base stations, the radio coverage/capacity of the air interface serving cells provided by these mobile base stations generally changes continuously with the physical locations of the mobile base stations. These changes or periods may be regular or irregular. The bearer transmission of NG, Xn, or other interfaces connecting these mobile base stations can no longer adopt the traditional fixed network transmission mode. Therefore, bearer transmission cannot be performed through fixed networks such as broadband optical fibers, but usually depends on radio bearer, such as microwave, laser, and other relay technologies. Although having more flexibility in deployment (no need for fixed site resources), such cellular mobile networks constructed with multiple mobile base stations can only perform planning and update management of the bearer transmission between the network resources and the network element nodes in a relatively dynamic manner. Otherwise, as each base station or network element node moves, the network topology or environmental conditions may continuously change, causing failure of the original old network element interface connection and configuration, while the new network element interface connection and configuration has not been set up and maintained yet. As shown in FIGS. 5a and 5b, there are several space-based satellite base stations, i.e., moving nodes 1/2/3/4 . . . , each of which provides a satellite serving beam from the space to a particular terrestrial coverage area to form a "small oval" shaped coverage of the terrestrial serving cells 1/2/3/4. However, as these satellite base stations collectively move to the left along the orbit, the coverage of their respective terrestrial serving cells 1/2/3/4 . . . also moves to the left with the satellite base stations, either continuously or in jumps. Assuming that there is further a master node MN providing a "large oval" shaped radio coverage, then it differs from FIG. 3 mainly in that the relative positional relationship between the "small oval" shaped coverage provided by the satellite base station and the "large oval" shaped coverage provided by the terrestrial MN will change dynamically. In addition, it may be impossible to set up a stable Xn interface connection between the satellite base station and the terrestrial base station; otherwise, the Xn interface connection will need to be set up, deleted, set up, deleted . . . constantly, and to be updated and maintained continuously.

Figure 6:
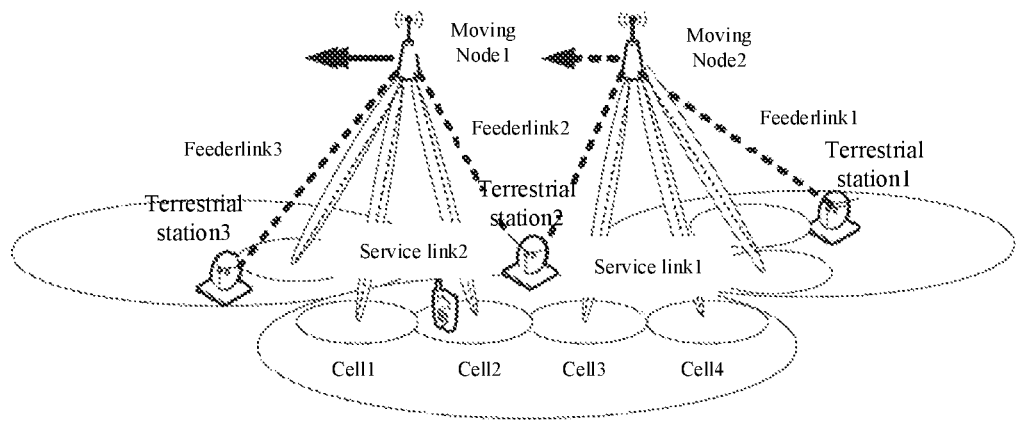
FIG. 6 is a schematic diagram illustrating setup and maintenance of a satellite base station feeder link.

The radio link between the UE and the satellite base station is generally called a service link, which is oriented to the served UE and directly carries user service data and RRC signaling over the 5G NR Uu air interface. From the perspective of a single UE, even if the UE is fixed in the original location, the service link of the UE will still change accordingly with constant movement of the satellite base station. As shown in FIG. 6, the radio link between the satellite base station and the serving terrestrial station is generally called a feeder link, which is configured to further enhance an End to End (E2E) connection between the service link and the terrestrial core network, so as to implement control signaling and user data transmission between the UE and the terrestrial network. The serving terrestrial station may include a satellite terrestrial gateway (Non-Terrestrial Networks Gateway, NTN-GW), a core network, and other centralized control network element nodes. The feeder link is required to provide at least a transmission function between the satellite base station and the terrestrial core network 5GC. If the satellite base station is a complete gNB, then the feeder link needs to provide stable transmission service for the NG interface, namely, to reliably transmit NGAP control signaling flow messages and NG-U user service data. Although the satellite base station remains in constant high-speed movement, it is usually default that the feeder link between the satellite base station and the terrestrial gateway NTN-GW may be robust enough. Therefore, a relatively stable NG interface connection instance can be set up, which does not need to be frequently updated and maintained due to multi-hop and relay routing of multiple terrestrial NTN-GW transmission layers. As shown in FIG. 6, when the satellite base station Moving node 1 gradually moves leftward from a jurisdiction of terrestrial station 2 to a jurisdiction of terrestrial station 3, through the terrestrial transmission relay between terrestrial station 2 and terrestrial station 3, it may be default that the NG interface instance between the satellite base station and the terrestrial core network anchor network element maintains unchanged. Therefore, there is no need to delete the old NG interface connection and rebuild new NG interface connection; and the process is repeated.

The DC/MC operation of the above UE has the characteristics of fixed physical locations of master and secondary nodes, fixed and relative robust Xn interface connection, MN master control and the like. Deployment of mobile base stations represented by the satellite base station has the characteristics of regular and periodical movement of the satellite base station along the orbit, non-fixed and relatively less robust Xn interface connection, and the like. Comprehensively considering the characteristics of DC/MC operations of the UE and the characteristics of mobile base station deployment, if the UE needs to perform DC/MC operations ("ground to space DC/MC" for short) between a terrestrial fixed base station and a mobile satellite base station, it may rely on a relatively more stable NG interface since the Xn interface between master and secondary nodes is not reliable.

The application provides a session processing method, in which a core network node can perform centralized control on operations of UE user plane sessions such as PDU sessions, including setup, modification, deletion and migration, in a DC/MC operating mode.

Figure 7:
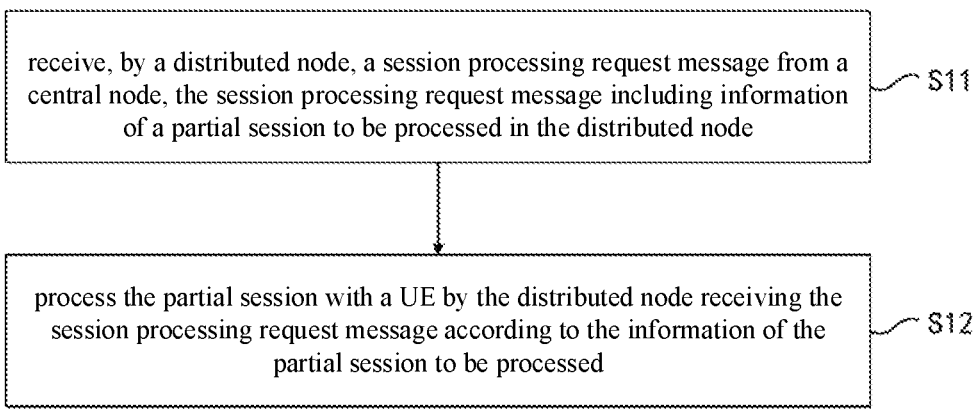
FIG. 7 is a schematic flowchart illustrating a session processing method according to an embodiment of the present application.

FIG. 7 is a schematic flowchart illustrating a session processing method according to an embodiment of the present application. As shown in FIG. 7, the method may include the following steps S11 to S12.

At step S11, a distributed node receives a session processing request message from a central node, the session processing request message including information of a partial session(s) to be processed in the distributed node.

At step S12, the partial session(s) with a UE is (are) processed by the distributed node receiving the session processing request message according to the information of the partial session(s) to be processed.

In the embodiment of the present application, the central node may be connected to multiple distributed nodes. The central node may be a node of a core network, such as a CN node or a 5GC node. The distributed node may be a node of an access network, such as an NG-RAN node, a satellite-RAN node, an EUTRAN node, etc.

In the embodiment of the present application, a PDU session is taken as an example for description. The central node may set up a PDU session at multiple distributed nodes, respectively. For example, one PDU session is split into multiple partial PDU sessions, which include partial QoS flows of the PDU session. For example, a PDU session 1 includes a QoS flow 1, a QoS flow 2, and a QoS flow 3. The QoS flow 1 of the PDU session 1 is on a node 1, while the QoS flows 2 and 3 of the PDU session 1 are on a node 2. Node 1 and node 2 each include a part of the PDU session 1.

When processing the session, the central node may send a session processing request message to one or more distributed nodes involved in the processing simultaneously or in a certain order. The one or more distributed nodes receiving the session processing request execute the corresponding processing. After the processing, the distributed node may send a corresponding response message to the central node to notify the central node of a result of the processing, for example, successful or failed processing.

For example, if a certain PDU session needs to be set up on two distributed nodes, the central node may request each of the two distributed nodes to set up a corresponding partial QoS flow(s) of the PDU session.

For another example, if a PDU session needs to be deleted and the PDU session is set up on three distributed nodes, the central node may send a request to each of the three distributed nodes to delete corresponding partial QoS flow(s) of the PDU session.

In an implementation, the session processing may include multiple types, exemplified as follows.

Example I: Session Setup

In this example, step S11 may include: receiving, by the distributed node, a session setup request message from the central node. The session setup request message includes identification (ID) information of partial PDU session(s) and/or information of partial QoS flow(s) of a PDU session to be set up at the corresponding distributed node.

Then, the distributed node receiving the session setup request message may set up the partial PDU session(s) with the UE and/or the partial QoS flow(s) of the PDU session with the UE according to the message.

Through the session setup process, one PDU session may be set up at multiple distributed nodes, on which several QoS flows of the PDU session are respectively configured.

For example, through the session setup process, QoS flows 1 and 2 of PDU session 1 are set up at node 1, while QoS flows 3, 4 and 5 of PDU session 1 are set up at node 2.

Example II: Session Modification

In this example, step S11 may include: receiving, by the distributed node, a session modification request message from the central node. The session modification request message includes information of partial QoS flow(s) of a PDU session to be deleted from the corresponding distributed node.

The distributed node receiving the session modification request message may delete the partial QoS flow(s) of the PDU session according to the message.

During the session modification process, after the partial QoS flow(s) of the PDU session is deleted, the session may still retain other QoS flows on the distributed node.

For example, QoS flows 1, 2 and 3 of PDU session 2 are set up at node 2. After QoS flows 1 and 2 of PDU session 2 are deleted through the session modification process, QoS flow 3 of PDU session 2 is still retained at node 2.

Example III: Session Deletion

In this example, step S11 may include: receiving, by the distributed node, a session deletion request message from the central node. The session deletion request message includes ID information of partial PDU session(s) to be deleted from the corresponding distributed node.

The distributed node receiving the session deletion request message may delete all QoS flow of the partial PDU session according to the message.

During the session deletion process, after all the QoS flows of the partial PDU session is deleted, the PDU session is deleted completed from the node, but other QoS flows of the PDU session may be retained on other distributed nodes.

For example, QoS flows 1 and 2 of PDU session 3 are set up at node 2, while QoS flows 3 and 4 of PDU session 3 are set up at node 3. After QoS flows 1 and 2 of PDU session 3 are deleted through the session deletion process, the PDU session 3 is completely deleted from node 2, but QoS flows 3 and 4 of PDU session 3 are still retained at node 3.

Example IV: Session Migration

In one mode, step S11 may include: receiving, by a target node, a first session migration command message from the central node. The first session migration command message includes ID information of partial PDU session(s) and/or information of partial QoS flow(s) of a PDU session to be migrated to the target node.

Step S11 may further include: receiving, by an original node, a second session migration command message from the central node. The second session migration command message includes ID information of partial PDU session(s) and/or information of partial QoS flow(s) of a PDU session to be migrated from the original node.

In another mode, the session migration request message may be sent from the original node to the central node. The session migration request message includes ID information of partial PDU session(s) and/or information of partial QoS flow(s) of a PDU session requested to be migrated from the original node. Then, the central node sends the first session migration command message to the target node.

In another mode, the central node may notify the original node to start the session migration process. Then, the original node sends a session migration request message to the central node. Thereafter, the central node sends the first session migration command message to the target node.

In summary, the session migration may be initiated by the original node, or by the central node instructing the original node, or by the central node directly.

According to the embodiments of the present application, partial sessions in distributed nodes can be processed by means of a central node, so as to perform centralized control on sessions in the distributed nodes, and thus facilitate improvement in the flexibility of multiple connectivity operations. For example, 5GC can perform centralized control on setup, modification, deletion, migration, and the like of a PDU session between the base station and UE.

Figure 8:
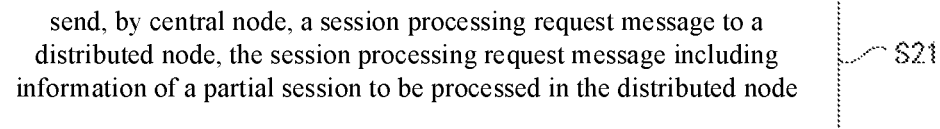
FIG. 8 is a schematic flowchart illustrating a session processing method according to another embodiment of the present application.

FIG. 8 is a schematic flowchart illustrating a session processing method according to another embodiment of the present application. As shown in FIG. 8, the method may include the following step S21.

At step S21, a central node sends a session processing request message to a distributed node, the session processing request message including information of partial session(s) to be processed in the distributed node.

The session processing request message is configured to instruct the distributed node receiving the session processing request message to process the partial session(s) with a UE according to the information of the partial session(s) to be processed.

In the embodiment of the present application, the central node is connected to multiple distributed nodes. The central node may set up one PDU session at multiple distributed nodes, respectively. When processing the session, the central node may send a session processing request message to one or more distributed nodes involved in the processing simultaneously or in a certain order. The one or more distributed nodes receiving the session processing request execute the corresponding processing.

In an implementation, the session processing may include multiple types, exemplified as follows.

Example I: Session Setup

In this example, step S21 may include: sending, by the central node, a session setup request message to the distributed node.

The session setup request message includes ID information of partial PDU session(s) and/or information of partial QoS flow(s) of a PDU session to be set up at the corresponding distributed node.

The session setup request message is configured to instruct the distributed node receiving the session setup request message to set up the partial PDU session(s) with the UE and/or the partial QoS flow(s) of the PDU session with the UE.

Example II: Session Modification

In this example, step S21 may include: sending, by the central node under the condition that partial QoS flow(s) of a PUD session at a distributed node need to be deleted, a session modification request message to the corresponding distributed node.

The session modification request message includes information of partial QoS flow(s) of a PDU session to be deleted from the corresponding distributed node.

The session modification request message is configured to instruct the distributed node receiving the session modification request message to delete the partial QoS flow(s) of the PDU session.

Example III: Session Deletion

In this example, step S21 may include: sending, by the central node under the condition that all QoS flows of partial PUD session(s) at the distributed node need to be deleted, a session deletion request message to the corresponding distributed node.

The session deletion request message includes ID information of partial PDU session(s) to be deleted from the corresponding distributed node.

The session deletion request message is configured to instruct the distributed node receiving the session deletion request message to delete all QoS flows of the partial PDU session(s) with the UE.

Example IV: Session Migration

In one mode, step S21 may include: sending, by the central node, a first session migration command message to a target node. The first session migration command message includes ID information of partial PDU session(s) and/or information of partial QoS flow(s) of a PDU session to be migrated to the target node. The first session migration command message is configured to instruct the target node to set up the partial PDU session(s) with the UE and/or the partial QoS flow(s) of the PDU session with the UE, or to modify the partial QoS flow(s) of the PDU session with the UE.

The central node sends a second session migration command message to the original node. The second session migration command message includes ID information of partial PDU session(s) and/or information of partial QoS flow(s) of a PDU session to be migrated from the original node. The second session migration command message is configured to instruct the original node to modify the partial QoS flow(s) of the PDU session with the UE; or to delete the partial PDU session(s) with the UE.

In another mode, step S21 may include: receiving, by the central node, a session migration request message from an original node. The session migration request message includes ID information of partial PDU session(s) and/or information of partial QoS flow(s) of a PDU session requested to be migrated from the original node. Then, the central node may send a first session migration command message to the target node.

In another mode, step S21 may include: sending, by the central node first, a notification message indicating that session migration may be initiated to the original node. The central node then receives the session migration request message from the original node. The session migration request message includes ID information of partial PDU session(s) and/or information of partial QoS flow(s) of a PDU session requested to be migrated from the original node. Then, the central node may send a first session migration command message to the target node.

The following description will be made by taking a dual connectivity operating mode as an example, and the related ideas and principles may be extended to a multiple connectivity operating mode.

The central node may include a node of a core network (CN) or a 5G core network (5GC), for example. The present application will be described taking a node of 5GC as the central node (hereinafter "5GC") as an example. One central node may be connected to multiple distributed nodes, e.g., RAN nodes. A RAN node may also be referred to as a base station. The base station in this application may include an E-UTRANRAN base station, a NG-RAN base station, a satellite base station, etc.

Taking the case of two distributed nodes as an example, it is assumed that one node is a terrestrial NG-RAN base station, and the other is a satellite base station. There is an interface between the central node and each distributed node. The interface between 5GC and the NG-RAN base station is an NG interface. The interface between 5GC and the satellite base station is also an NG interface.

In an example, the central node-based session setup, modification, and deletion may include: setting up, by the central node, one or more user plane sessions, e.g., PDU sessions, for one UE.

The central node decides to set up different PDU sessions to different RAN nodes, or to set up different QoS flows of a PDU session to different RAN nodes.

The central node sends a session setup request message, session modification request message, or session deletion request message to the RAN nodes, respectively. Each session setup request message, session modification request message, or session deletion request message may include IDs of partial PDU sessions in the PDU session set to be set up, modified or deleted by the target RAN node, or IDs of partial QoS flows of the same one PDU session.

Subsequently, multiple PDU sessions of the UE are set up to, modified on and/or deleted from the RAN nodes, respectively, or multiple QoS flows of the PDU session/sessions of the UE are set up to, modified on and/or deleted from the RAN nodes, respectively.

In an example, the central node-based session migration may be implemented by any one or more of the following methods.

Method 1: actively migrating, by the central node, a PDU session or several QoS flows in the PDU session from a base station 1 to another target base station 2. This method may refer to setup, modification and deletion processes of PDU sessions in the above examples. For example, for QoS flows of a PDU session, when a QoS flow is removed from one node, the same is added on another node. In order to guarantee the setup and deletion of the same QoS flow on different nodes, synchronous configuration is required. For example, the synchronous configuration ensures that deletion of some QoS flows on a node and addition of the same on another node come into force at the same time. Otherwise, it may happen to the UE that one QoS flow is present on different nodes at the same time, or is not present on any node.

Method 2: notifying, by the central network element, the node 1 to initiate the migration process, i.e., notifying, by the central network element, the node 1 to initiate a handover preparation process.

Method 3: triggering, by the node 1, the handover preparation process. The method of triggering migration by the node 1 does not need synchronous configuration.

Figure 9:
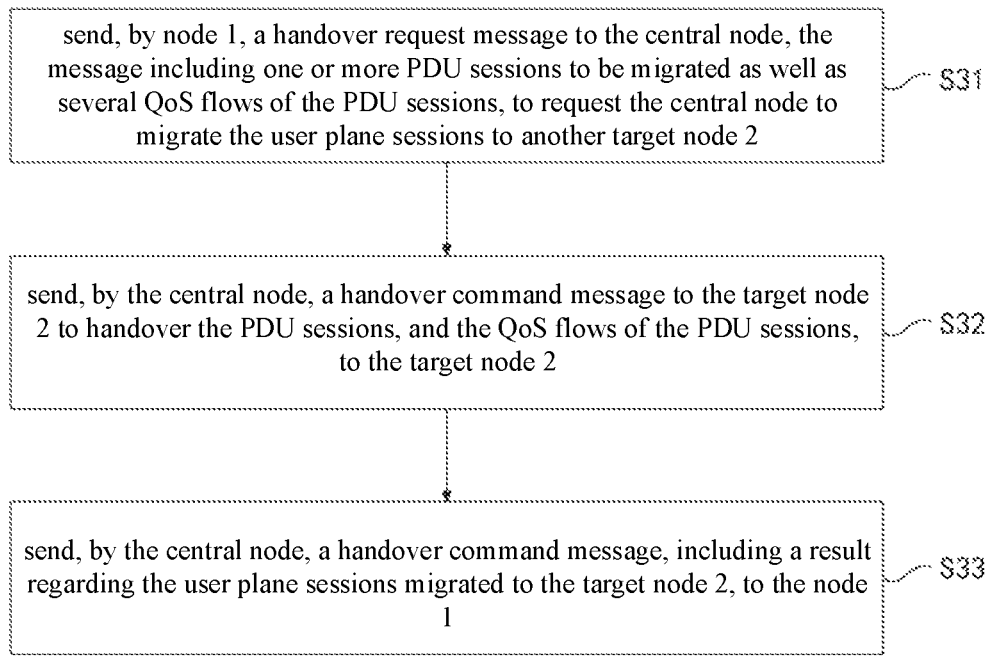
FIG. 9 is a schematic flowchart illustrating session migration by means of a handover preparation process.

In an example, as shown in FIG. 9, the handover preparation process of the method 3 may include the following steps S31 to S33.

At step S31: the node 1 sends a handover request message to the central node, the message including one or more PDU sessions to be migrated as well as several QoS flows of the one or more PDU sessions, and requests the central node to migrate the user plane session(s) to another target node 2.

At step S32: the central node sends a handover command message to the target node 2 to handover and migrate the PDU session(s), and the QoS flows of the PDU session(s), to the target node 2. The PDU session(s) are then carried and transmitted by the target node 2.

At step S33: the central node sends a handover command message, including a result regarding the user plane session(s) migrated to the target node 2, to the node 1. Compared with method 3, the method 2 further includes the notification process/message of the core network element before step S31, so that the node 1 is notified by the central node that the handover preparation process can be initiated.

One networking architecture to which the present application may be applied includes one core network element (i.e., one central node) connected to multiple access network base stations (e.g., distributed nodes such as 4G RANs, 5G RANs, satellite RANs, etc.). There is no interface (e.g., no X2 interface, no Xn interface) between these access network base stations, but there is an interface (e.g., an NG interface, an Si interface) between each access network and the core network.

The session processing method provided by the application can control the UE to perform DC/MC data transmission through 5GC, without setting up and maintaining the Xn interface connection between the master and secondary nodes. 5GC and the master and secondary nodes are connected through respective independent NG interfaces. Since there is no interface between the master and secondary nodes, the present application, based on the interface between the core network and the access network, performs master control on the setup, modification, deletion, migration, and other processing of the user plane sessions (for example, PDU sessions) through the core network.

In the present application, a central node (5GC, CN, etc.) may be connected to multiple distributed nodes (e.g., node 1, node 2, node 3 . . . ) at the same time. Several application examples are described below, taking the case where a central node is connected to two nodes at the same time as an example.

Application Example 1: PDU Session Initial Setup

The preset conditions include:
(1) a terrestrial NG-RAN node (hereinafter "NG-RAN") and a satellite-RAN node (hereinafter "satellite-RAN") share one 5GC core network;
(2) the UE has the capability to access both the NG-RAN and the satellite-RAN;
(3) the network knows that the UE is in an overlapping coverage area of the NG-RAN and the satellite-RAN; and
(4) the UE resides in one NR cell. If the UE is in an RRC IDLE or RRC INACTIVE state, the UE needs to set up RRC connection first. The UE sets up one or more PDU sessions (each including one or more QoS flows) to the core network.

The 5GC sets up multiple PDU sessions set up by the same UE (different PDU sessions have different IDs, namely PDU session IDs) on different nodes (such as node 1, node 2 and node 3 . . . ). The 5GC sets up the same PDU session (i.e., the same PDU session that has the same PDU session ID) set up by the same UE on multiple nodes (e.g., node 1, node 2, node 3 . . . ).

For example, the 5GC transmits a PDU session resource setup request message to the NG-RAN node and the satellite-RAN node, respectively. The message may include the same PDU session, or may include different QoS flows of the same PDU session.

Figure 10A:
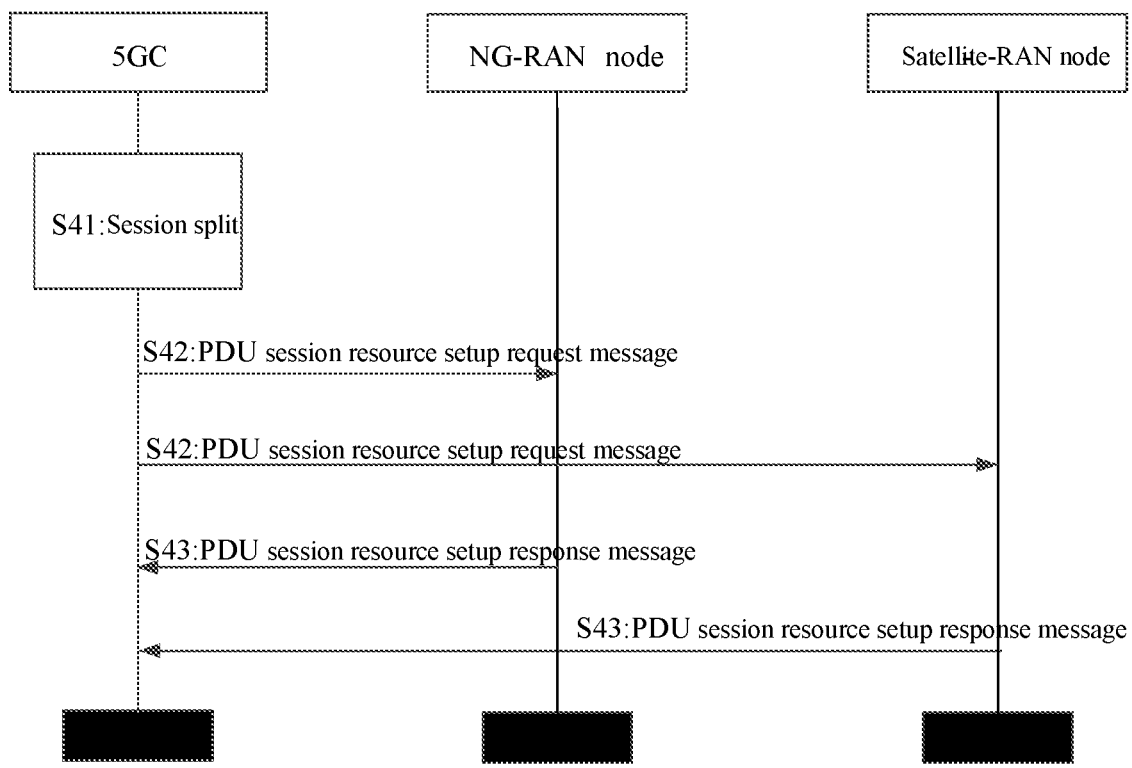
FIG. 10a is a schematic flowchart illustrating setup of a PDU session.

In an example, as shown in FIG. 10*a*, the PDU session setup process includes the following steps S41 to S43.

At step S41: when a PDU session includes two or more QoS flows, the 5GC may decide to split the PDU session. For example, the user planes of partial QoS flows of the PDU session are set up on the NG-RAN, while the rest are set up on the satellite-RAN.

If the PDU session ID is A and the QoS flows included in the PDU session A are QF1, QF2, QF3, QF4 and QF5, it may be expressed by:

PDU Session ID=A→{QF1, QF2, QF3, QF4, QF5}.

The split PDU session set up on the NG-RAN may be expressed as: PDU Session ID=A→{QF1, QF2, QF3}.

The split PDU session set up on the satellite-RAN may be expressed as: PDU Session ID=A→{QF4, QF5}.

Thus, the split PDU sessions set up on the NG-RAN and the satellite-RAN have the same PDU session ID.

At step S42: through the PDU session resource setup process via the NG interface, the 5GC sets up the split PDU sessions with the NG-RAN and the satellite-RAN, respectively.

The PDU session resource setup request message sent from the 5GC (e.g., AMF) to the NG-RAN includes: PDU Session ID=A, where the PDU session includes {QF1, QF2, QF3}.

The PDU session resource setup request message sent from the 5GC (e.g., AMF) to the satellite-RAN includes: PDU Session ID=A, where the PDU session includes {QF4, QF5}.

At step S43: after receiving the PDU session setup request message, the NG-RAN and the satellite-RAN respectively set up bearer with the UE at an air interface. If the split PDU sessions are set up successfully, the NG-RAN and the satellite-RAN respectively send a PDU session resource setup response message including QoS flows that are successfully set up or not to the AMF.

A certain PDU session is split during the PDU session setup process. The QoS flows of the PDU session are set up on one or more nodes, respectively. For example, partial QoS flows of the PDU session are set up on the NG-RAN, while the rest are set up on the satellite-RAN. The PDU session setup response message of each node may include only QoS flows that are successfully set up and not include those failed.

Application Example 2: PDU Session Modification/Deletion

One or more PDU sessions of a certain UE have been successfully set up on one or more nodes (e.g., node 1, node 2, node 3 . . . ).

If one or some of the PDU sessions is ended, the 5GC may trigger a PDU session resource modification process to delete the PDU session(s).

If configuration parameters of one or some of the PDU sessions need to be modified, the 5GC may trigger a PDU session resource release process to modify the configuration parameters of the PDU session(s).

If configuration parameters of one or some of the QoS flows of a PDU session need to be modified, the 5GC may trigger a PDU session resource release process to modify the configuration parameters of the QoS flow(s) of the PDU session.

If one or some of the QoS flows of a PDU session is ended, the 5GC may trigger a PDU session resource release process to delete the QoS flow(s).

Figure 10B:
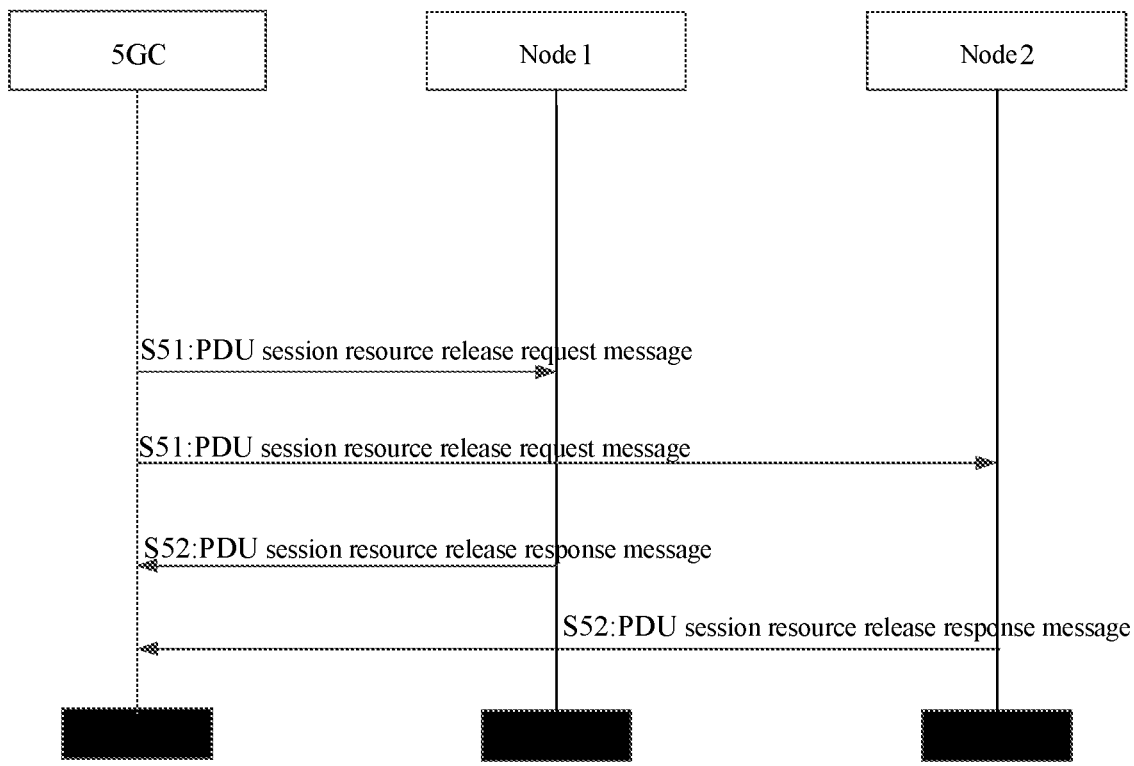
FIG. 10b is a schematic flowchart illustrating deletion of a PDU session.
Figure 10C:
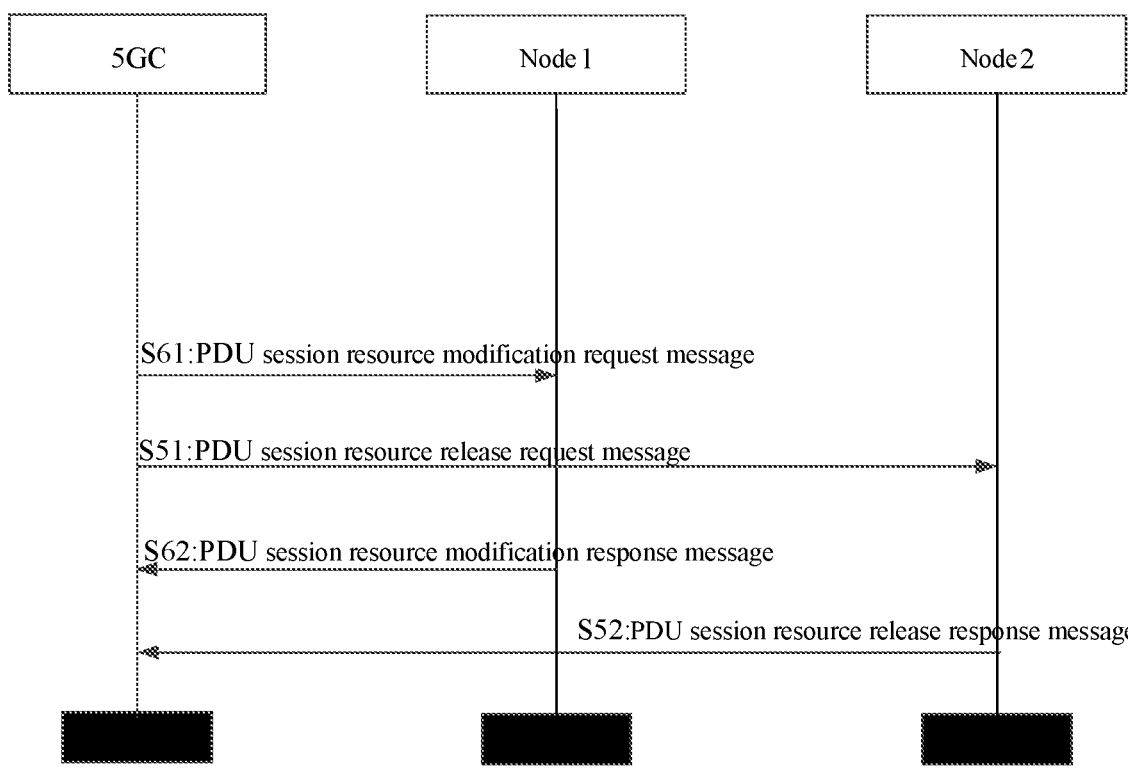
FIG. 10c is a schematic flowchart illustrating deletion and release of a PDU session.

It is assumed that the PDU sessions and/or QoS flows of the PDU sessions are set up on one or more nodes (e.g., node 1, node 2, node 3 . . . ). As shown in FIGS. 10*b* and 10*c*, the 5GC may transmit multiple PDU session resource modification request messages (S51) or PDU session resource release request messages (S61) to multiple nodes, respectively. After deletion or release of the session is completed, the node may return a corresponding response (S52, S62).

It is assumed that multiple QoS flows belonging to the same PDU session are set up on multiple nodes, respectively. As shown in FIG. 10*b*, when deleting the PDU session, the 5GC needs to send a PDU session resource release request message to the corresponding nodes, respectively (S61, see scenario 1 below).

It is assumed that multiple QoS flows belonging to the same PDU session are set up on multiple nodes, respectively. When the 5GC deletes partial QoS flows of the PDU session, if all the QoS flows of the PDU session on a certain node are deleted, the 5GC transmits a PDU session resource release request message to the node (S61) since the PDU session no longer exists on that node. Otherwise, a PDU session resource modification request message is sent (S51, see scenario 3 below).

The preset conditions include:
(1) one UE has set up three PDU sessions in two nodes (e.g., node 1 and node 2), and each PDU session contains several QoS flows;
(2) the multiple PDU sessions are expressed as: {PDU Session ID=1, PDU Session ID=2, PDU Session ID=3};
(3) the QoS flows included in each PDU session are expressed as:

PDU Session ID=1=>{QoS flow ID=1, QoS flow ID=2, QoS flow ID=3};

PDU Session ID=2=>{QoS flow ID=1, QoS flow ID=3, QoS flow ID=4}; and

PDU Session ID=3=>{QoS flow ID=2, QoS flow ID=4, QoS flow ID=5}.

The PDU session and QoS flows set up at node 1 are expressed as:

PDU Session ID=1=>{QoS flow ID=1, QoS flow ID=2, QoS flow ID=3}; and

PDU Session ID=2=>{QoS flow ID=1, QoS flow ID=3}.

The PDU session and QoS flows set up at node 2 are expressed as:

PDU Session ID=2=>{QoS flow ID=4}; and

PDU Session ID=3=>{QoS flow ID=2, QoS flow ID=4, QoS flow ID=5}.

It can be seen that all QoS flows of PDU session 1 are set up at node 1; all QoS flows of PDU session 3 are set up at node 2; partial QoS flows of PDU session 2 are set up at node 1; and the remaining QoS flows of PDU session 2 are set up at node 2.

The PDU session resource modification process and PDU session resource release process are explained in conjunction with the following scenarios.

Scenario 1) 5GC Requests Deletion of all QoS Flows of PDU Session 2.

As shown in FIG. 10*b*, the 5GC sends PDU session resource release request messages to node 1 and node 2, respectively.

Scenario 2) 5GC Requests Deletion of PDU Session 1.

The 5GC sends a PDU session resource release request message to node 1.

Scenario 3) 5GC Requests Deletion of QoS Flows 1 and 4 of PDU Session 2.

As shown in FIG. 10*c*, the 5GC sends a PDU session resource modification request message to node 1. In this manner, partial QoS flows of PDU session 2 at node 1 are deleted, but the PDU session still exists at node 1.

The 5GC sends a PDU session resource release request message to node 2. In this manner, all QoS flows of PDU session 2 at node 2 are deleted, so the PDU session no longer exists at node 2.

Scenario 4) 5GC Requests Modification of QoS Flows 1 and 4 of PDU Session 2.

The 5GC sends PDU session resource modification request messages to node 1 and node 2, respectively.

Scenario 5) 5GC Requests Modification of QoS Flow 1 of PDU Session 2.

The 5GC sends a PDU session resource modification request message to node 1.

Application Example 3: PDU Session Migration

One or more PDU sessions of a certain UE have been successfully set up on one or more nodes, (e.g., node 1, node 2, node 3 . . . ). If, due to movement of the UE, or load changes of node 1, or internal policies of the central node, some or all PDU sessions on an original node (e.g., node 1), or some QoS flows thereof, need to be migrated to one or more other target nodes (e.g., node 1, node 2, node 3 . . . ), an NG interface-based handover process may be employed. The handover process is only an example but not limitation, and the session migration may also be implemented by other processes or by adding messages related to migration.

For a certain UE, all PDU sessions of the original NG-RAN typically need to be handed over completely to the target NG-RAN. In the present application, for a PDU session on a certain RAN node of a certain UE, partial PDU sessions or partial QoS flows of one PDU session are allowed to be migrated to one or more other RAN nodes. That is, partial (not necessarily all) PDU sessions and partial (not necessarily all) QoS flows of a UE is allowed to be migrated from one original node to one or more target nodes. This example is illustrated taking migration between two nodes, assuming migration from NG-RAN to satellite-RAN as an example, and vice versa.

The preset conditions include:

(1) one or more PDU sessions of the UE have been set up.

(2) partial PDU sessions, or partial QoS flows of the PDU sessions, need to be handed over from NG-RAN to satellite-RAN, and vice versa.

Figure 11:
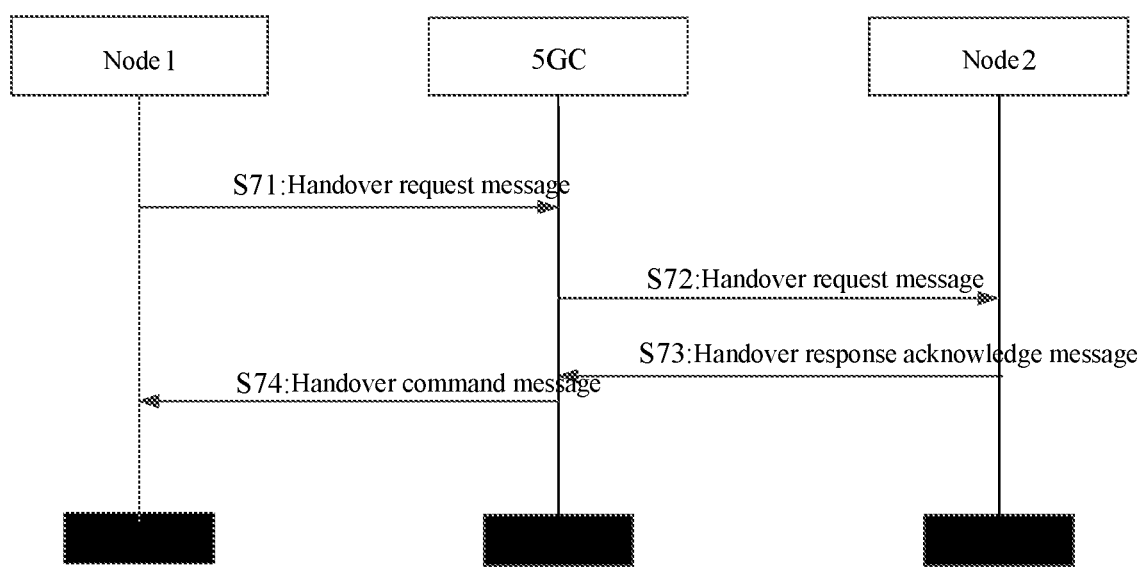
FIG. 11 is a schematic flowchart illustrating a session migration process based on a NG handover process.

As shown in FIG. 11, the session migration based on the NG handover process may include the following steps S71 to S74.

At step S71: the original node (node 1) sends a handover request message to the 5GC, the message including one or more PDU sessions as well as one or more QoS flows of the PDU sessions. The original node may include, but is not limited to, a NG-RAN node, a satellite-RAN node, an EUTRAN node.

When no QoS flow is included in a PDU session, it indicates that the existing QoS flows of the PDU session are all requested to be handed over from node 1 to the target node.

For example, several PDU sessions have been set up in the original node, and each PDU session contains several QoS flows.

The PDU sessions include: {PDU Session ID=1, PDU Session ID=2, PDU Session ID=3}, PDU Session ID=1=>{QoS flow ID=1, QoS flow ID=2, QoS flow ID=3}, PDU Session ID=2=>{QoS flow ID=1, QoS flow ID=3, QoS flow ID=4}, and PDU Session ID=3=>{QoS flow ID=2, QoS flow ID=4, QoS flow ID=5}.

In the handover request message, the PDU sessions and QoS flows requested to be migrated include:

PDU Session ID=1;

PDU Session ID=2=>{QoS flow ID=3, QoS flow ID=4}.

This means that: PDU session 3 does not need to be migrated, i.e., remains on the original node. All QoS flows of PDU session 1 needs to be migrated to the target node (if the message includes only a certain PDU session ID but no QoS flow, it means that all the QoS flows of that PDU session are to be migrated to the target node). Partial QoS flows of PDU session 2 is migrated to the target node, but QoS flow 1 of PDU session 2 remains on the original node.

At step S72: the 5GC sends handover request messages to one or more target nodes (e.g., node 2, node 3, node 4, . . . ), respectively. If the target node includes only node 2, a handover request message is sent to node 2. If there are multiple target nodes, multiple handover request messages are sent to the multiple target nodes accordingly. The message includes the PDU sessions in step S71, and may further include the QoS flows of the PDU sessions in step S71. The target node may include, but is not limited to, a NG-RAN node, a satellite-RAN node, an EUTRAN node.

For example, if the 5GC decides to determine one node (i.e., node 2) as the target node, the 5GC sends a handover request message to node 2, the message including:

PDU Session ID=1=>{QoS flow ID=1, QoS flow ID=2, QoS flow ID=3};

PDU Session ID=2=>{QoS flow ID=3, QoS flow ID=4}.

For another example, if the 5GC decides to determine two nodes (i.e., node 2 and node 3) as target nodes, the 5GC sends two handover request messages to node 2 and node 3, respectively.

The handover request message sent from the 5GC to node 2 includes:

PDU Session ID=1=>{QoS flow ID=1, QoS flow ID=2}.

The handover request message sent from the 5GC to node 3 includes:

PDU Session ID=1=>{QoS flow ID=3}; and
PDU Session ID=2=>{QoS flow ID=3, QoS flow ID=4}.

This means that: partial QoS flows of PDU session 1 on the original node is migrated to node 1, and partial QoS flows of PDU session 1 is migrated to node 2; and the whole PDU session 2 is migrated to node 2.

At step S73: each target node, if allows setup of the PDU session or QoS flows of the PDU session, sends a handover response acknowledge message to the 5GC.

If the target node includes only node 2, node 2 sends a handover response acknowledge message to the 5GC.

If the target node includes multiple nodes, each target node sends a corresponding handover response acknowledge message to the 5GC. That is, the 5GC may receive multiple handover response acknowledge messages.

At step S74: upon receiving the response message from node 2, the 5GC sends a handover command message to the original node, i.e., node 1.

Figure 12:
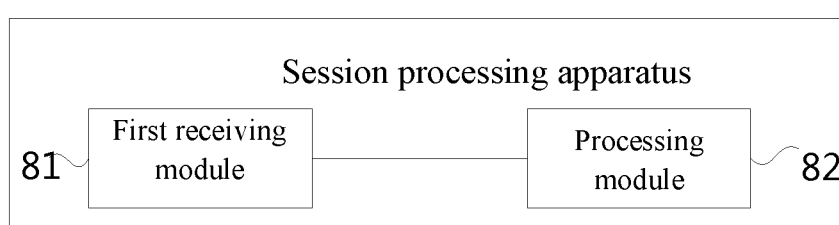
FIG. 12 is a schematic structural diagram of a session processing apparatus according to an embodiment of the present application.

FIG. 12 is a schematic structural diagram of a session processing apparatus according to an embodiment of the present application. As shown in FIG. 12, the apparatus may include: a first receiving module 81 configured to receive a session processing request message from a central node, wherein the session processing request message including information of partial sessions to be processed in corresponding distributed nodes, and the central node being connected to multiple distributed nodes; and a processing module 82 configured to process the partial sessions with a UE according to the information of the partial sessions to be processed.

In an implementation, the apparatus may be disposed at a distributed node of a core network. The central node is connected to multiple distributed nodes. The central node may set up one PDU session at multiple distributed nodes, respectively. After receiving the session processing request message from the central node, the first receiving module of the distributed node may process the partial sessions with a UE according to the information of the partial sessions to be processed.

Figure 13:
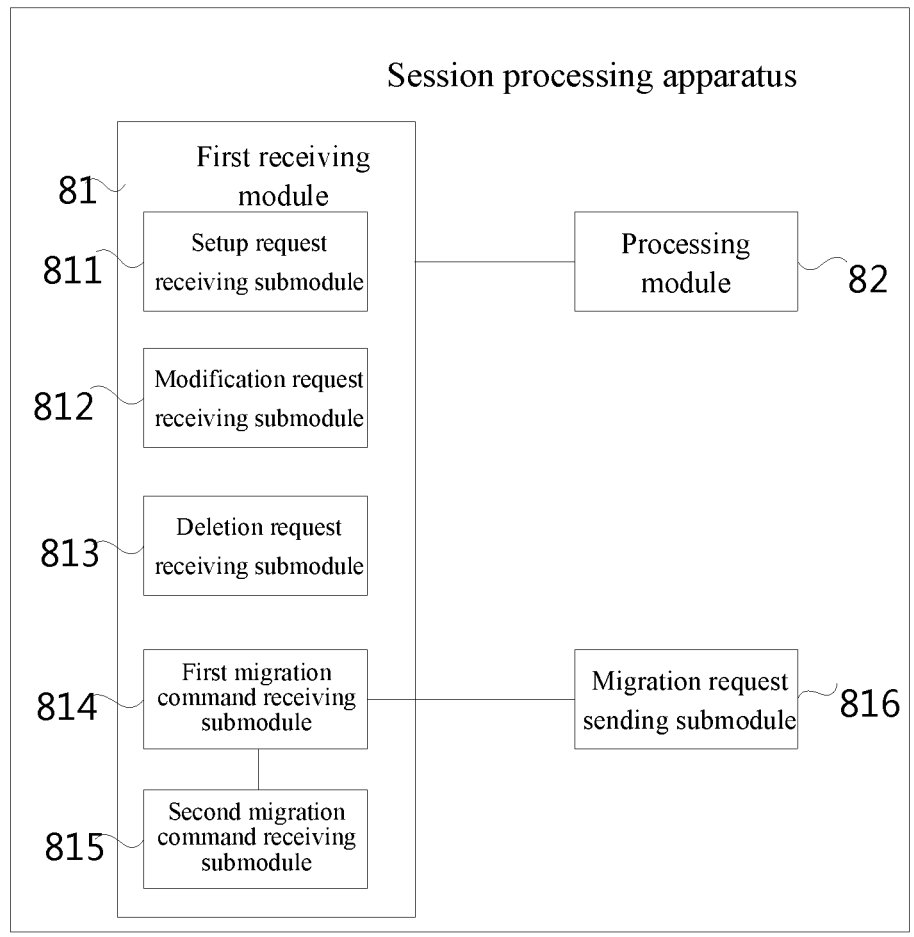
FIG. 13 is a schematic structural diagram of a session processing apparatus according to another embodiment of the present application.

In an implementation, as shown in FIG. 13, the first receiving module 81 may include: a setup request receiving submodule 811 configured to receive a session setup request message from the central node. The session setup request message includes ID information of partial PDU sessions and/or information of partial QoS flows of a PDU session to be set up at the corresponding distributed node.

Accordingly, the processing module 82 may be further configured to set up the partial session with the UE according to the session setup request message. For example, partial QoS flows of a PDU session is set up on the distributed node, while other QoS flows of the PDU session may be set up on other distributed nodes.

In an implementation, the first receiving module 81 may further include: a modification request receiving submodule 812 configured to receive a session modification request message from the central node. The session modification request message includes information of partial QoS flows of a PDU session to be deleted from the corresponding distributed node.

Accordingly, the processing module 82 may be further configured to delete partial QoS flows of a PDU session on the distributed node according to the session modification request message.

In an implementation, the first receiving module may further include:

a deletion request receiving submodule 813 configured to receive a session deletion request message from the central node. The session deletion request message includes ID information of partial PDU sessions to be deleted from the corresponding distributed node.

Accordingly, the processing module 82 may be further configured to delete all QoS flows of a PDU session on the distributed node according to the session deletion request message.

In an implementation, the first receiving module 81 may further include: a first migration command receiving submodule 814 configured to receive a first session migration command message from the central node. The first session migration command message includes ID information of partial PDU sessions and/or information of partial QoS flows of a PDU session to be migrated to the target node. This submodule may be set in a target node for migration.

In an implementation, the first receiving module 81 may further include: a second migration command receiving submodule 815 configured to receive a second session migration command message from the central node. The second session migration command message includes ID information of partial PDU sessions and/or information of partial QoS flows of a PDU session to be migrated from the original node. This submodule may be set in an original node for migration.

In an implementation, the apparatus further includes: a migration request sending submodule 816 configured to send a session migration request message to the central node. The session migration request message includes ID information of partial PDU sessions and/or information of partial QoS flows of a PDU session requested to be migrated from the original node. This submodule may be set in an original node for migration.

Figure 14:
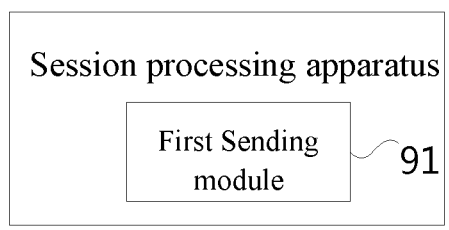
FIG. 14 is a schematic structural diagram of a session processing apparatus according to another embodiment of the present application.

FIG. 14 is a schematic structural diagram of a session processing apparatus according to another embodiment of the present application. As shown in FIG. 14, the apparatus may include: a first sending module 91 configured to send a session processing request message to a distributed node. The session processing request message includes information of partial sessions to be processed in corresponding distributed nodes, and the central node is connected to multiple distributed nodes.

The session processing request message is configured to instruct the distributed node receiving the session processing request message to process the partial sessions with a UE according to the information of the partial sessions to be processed.

Figure 15:
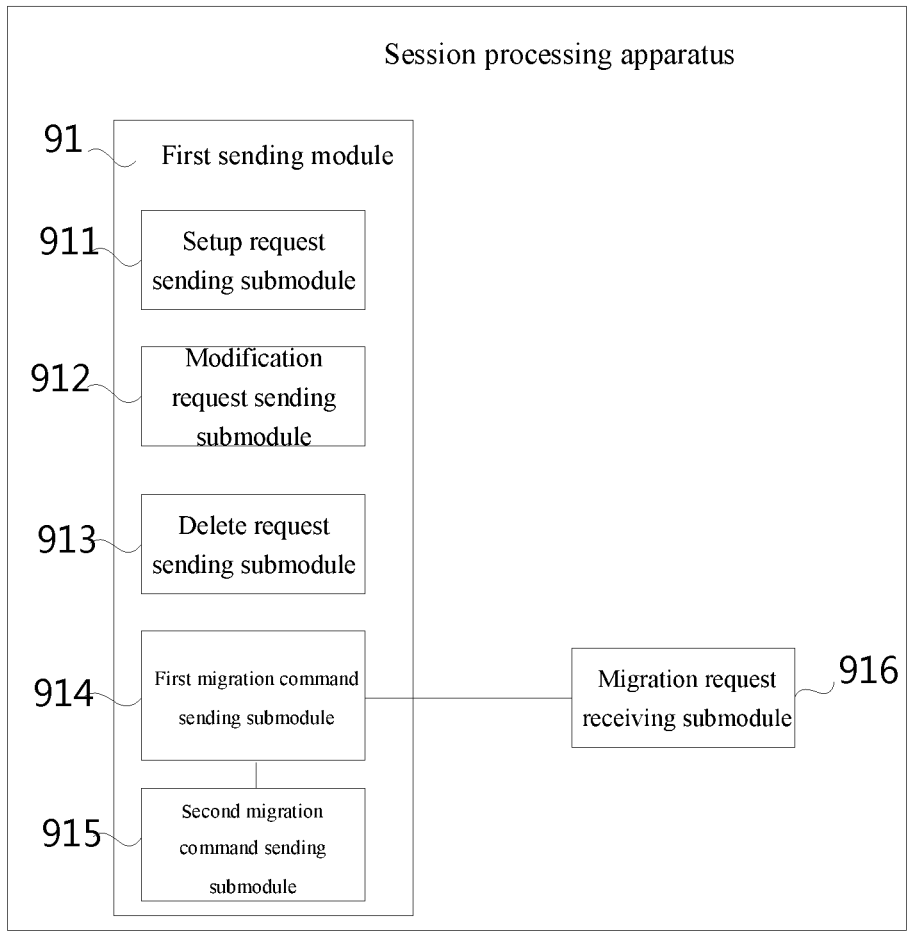
FIG. 15 is a schematic structural diagram of a session processing apparatus according to another embodiment of the present application.

In an implementation, as shown in FIG. 15, the first sending module 91 may include: a setup request sending submodule 911 configured to send a session setup request message to a distributed node.

The session setup request message includes ID information of partial PDU sessions and/or information of partial QoS flows of a PDU session to be set up at the corresponding distributed node.

The session setup request message is configured to instruct the distributed node receiving the session setup request message to set up the partial PDU sessions with the UE and/or the partial QoS flows of the PDU session with the UE.

In an implementation, the first sending module 91 may further include: a modification request sending submodule 912 configured to send, under the condition that partial QoS flows of a PUD session at a distributed node need to be deleted, a session modification request message to the corresponding distributed node.

The session modification request message includes information of partial QoS flows of a PDU session to be deleted from the corresponding distributed node.

The session modification request message is configured to instruct the distributed node receiving the session modification request message to delete the partial QoS flows of the PDU session.

In an implementation, the first sending module may further include:

a deletion request sending submodule 913 configured to send, under the condition that all QoS flows of partial PUD sessions at a distributed node need to be deleted, a session deletion request message to the corresponding distributed node.

The session deletion request message includes ID information of partial PDU sessions to be deleted from the corresponding distributed node.

The session deletion request message is configured to instruct the distributed node receiving the session deletion request message to delete all QoS flows of the partial PDU sessions with the UE.

In an implementation, the first sending module 91 may further include: a first migration command sending submodule 914 configured to send a first session migration command message to a target node.

The first session migration command message includes ID information of partial PDU sessions and/or information of partial QoS flows of a PDU session to be migrated to the target node.

The first session migration command message is configured to instruct the target node to set up the partial PDU sessions with the UE and/or the partial QoS flows of the PDU session with the UE, or to modify the partial QoS flows of the PDU session with the UE.

In an implementation, the first sending module 91 may further include: a second migration command sending submodule 915 configured to send a second session migration command message to an original node. The second session migration command message includes ID information of partial PDU sessions and/or information of partial QoS flows of a PDU session to be migrated from the original node.

The second session migration command message is configured to instruct the original node to modify the partial QoS flows of the PDU session with the UE; or to delete the partial PDU sessions with the UE.

In an implementation, the apparatus may further include:

a migration request receiving submodule 916 configured to receive a session migration request message from an original node.

The session migration request message includes ID information of partial PDU sessions and/or information of partial QoS flows of a PDU session requested to be migrated from the original node.

For functions of the modules in the apparatus according to the embodiments of the present application, reference may be made to the corresponding descriptions in the method embodiments, which are not repeated here.

Figure 16:
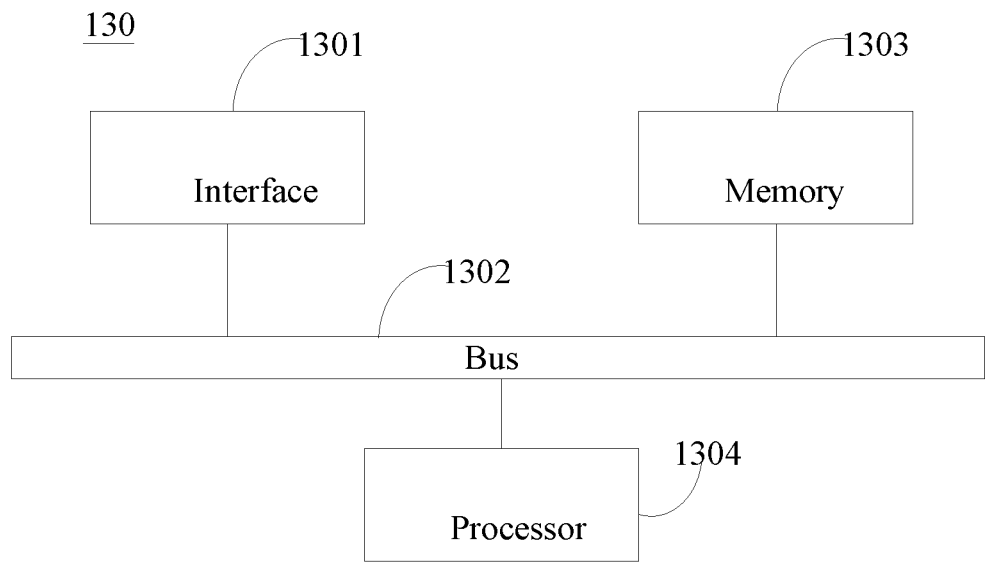
FIG. 16 is a schematic structural diagram of a network device according to an embodiment of the present application.

FIG. 16 is a schematic structural diagram of a network device according to an embodiment of the present application. As shown in FIG. 16, the network device 130 provided by the embodiment of the present application includes a memory 1303 and a processor 1304. The network device 130 may further include an interface 1301 and a bus 1302. The interface 1301, the memory 1303 and the processor 1304 are connected via the bus 1302. The memory 1303 is configured to store instructions. The processor 1304 is configured to read the instructions to implement the technical solutions in the method embodiments applied to the access network elements. The implementation principle and technical effects are similar to that of the method embodiments and thus are not repeated here.

Figure 17:
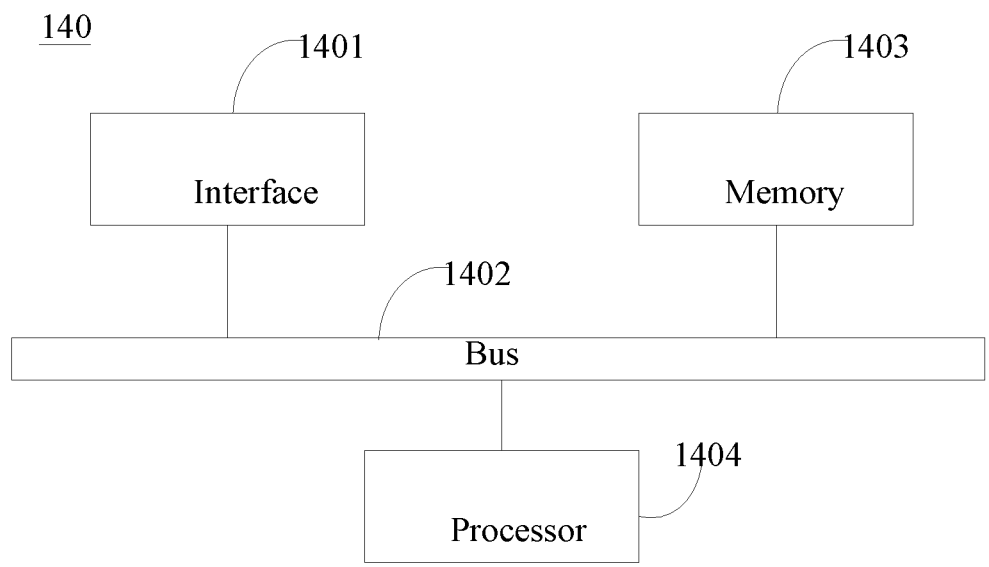
FIG. 17 is a schematic structural diagram of a network device according to an embodiment of the present application.

FIG. 17 is a schematic structural diagram of a network device according to an embodiment of the present application. As shown in FIG. 17, the network device 140 provided by the embodiment of the present application includes a memory 1403 and a processor 1404. The network device may further include an interface 1401 and a bus 1402. The interface 1401, the memory 1403 and the processor 1404 are connected via the bus 1402. The memory 1403 is configured to store instructions. The processor 1404 is configured to read the instructions to implement the technical solutions in the method embodiments applied to the core network elements. The implementation principle and technical effects are similar to that of the method embodiments and thus are not repeated here.

Figure 18:
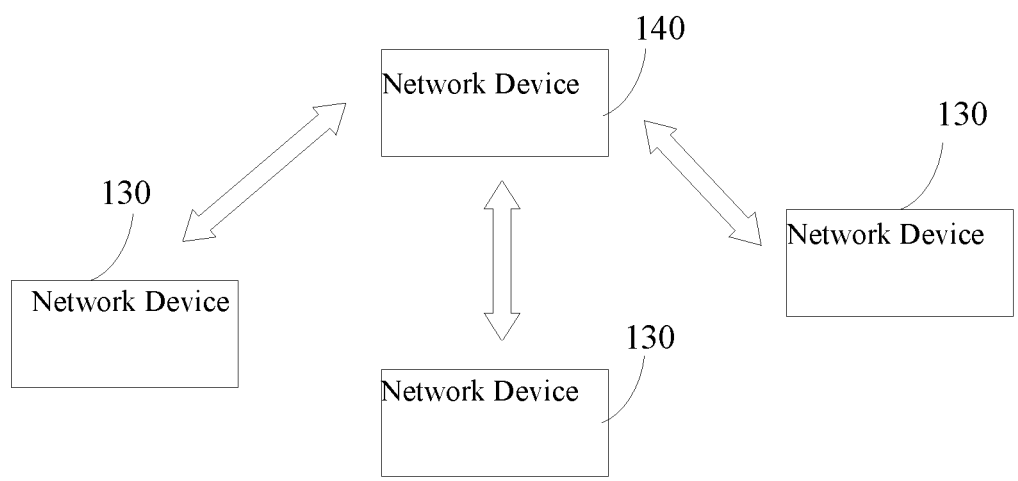
FIG. 18 is a schematic structural diagram of a communication system according to an embodiment of the present application.

FIG. 18 is a schematic structural diagram of a communication system according to an embodiment of the present application. As shown in FIG. 18, the system includes the network device 130 as described in the above embodiment and the network device 140 as described in the above embodiment.

The present application provides a storage medium having a computer program stored thereon which, when executed by a processor, cause the methods of the above embodiments to be implemented.

The above are only exemplary embodiments of the present application and not intended to limit the scope of the present application.

In general, the various embodiments of the application may be implemented in hardware or dedicated circuits, software, logic or any combination thereof. For example, some aspects may be implemented in hardware, while other aspects may be implemented in firmware or software which may be executed by a controller, microprocessor or other computing device, although the application is not limited thereto.

Embodiments of the application may be implemented by a data processor of a mobile device executing computer program instructions, for example in a processor entity, or by hardware, or by a combination of software and hardware. The computer program instructions may be assembly instructions, instruction set architecture (ISA) instructions, machine instructions, machine-related instructions, microcode, firmware instructions, state setting data, or source code or object code written in any combination of one or more programming languages.

The block diagrams of any logic flows in the figures of this application may represent program steps, or may represent interconnected logic circuits, modules, and functions, or may represent a combination of program steps and logic circuits, modules, and functions. The computer program may be stored on a memory. The memory may be of any type suitable to the local technical environment and may be implemented using any suitable data storage technology. It will be appreciated that the memory in the embodiment of the disclosure may be either a volatile memory or a nonvolatile memory or may include both. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM) used as an external cache. The RAM may include various forms, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). The memory of the system and the method described herein is intended to include, but not limited to, these and any other suitable types of memories.

The processor in the embodiments of the present application may be of any type suitable to the local technical environment, such as but not limited to general purpose computers, special purpose computers, microprocessors, Digital Signal Processors (DSPs), Application Specific Integrated Circuits (ASICs), Field-Programmable Gate Arrays (FGPAs) or other programmable logic devices, discrete gates or transistor logic devices, discrete hardware components, or processors based on a multi-core processor architecture. The general purpose processor may be a microprocessor or may be any conventional processor or the like. The processor described above may implement or perform the steps of the methods disclosed in the embodiments of the present application. The software module may be located in a storage medium well known in the art, such as an RAM, a flash, an ROM, a PROM or EPROM, a register, or the like. The storage medium is located in a memory, and a processor reads information in the memory and combines hardware thereof to complete the steps of the method.

The foregoing has provided by way of exemplary and non-limiting examples a detailed description of exemplary embodiments of the present application. Various modifications and adaptations to the foregoing embodiments may become apparent to those skilled in the art in view of the accompanying drawings and the appended claims, without departing from the scope of the application. Accordingly, the proper scope of the application is to be determined according to the claims.

What is claimed is:

1. A session processing method, comprising:
   receiving, by a distributed node, a session processing request message from a central node, wherein the session processing request message comprises information of a partial session to be processed of one session in the distributed node, the central node is connected to multiple distributed nodes comprising the distributed node, and the multiple distributed nodes comprise a Next Generation Radio Access Network (NG-RAN) node, a satellite-RAN node, and an Evolved Universal Terrestrial Radio Access Network (EUTRAN) node; and
   processing the partial session with a user equipment (UE) by the distributed node receiving the session processing request message according to the information of the partial session to be processed,
   wherein the one session comprises a plurality of partial sessions, and the plurality of partial sessions are to be processed in at least two of the multiple distributed nodes, respectively.

2. The method according to claim 1, wherein the step of receiving, by the distributed node, the session processing request message from the central node comprises:
   receiving, by the distributed node, a session setup request message from the central node;
   wherein the session setup request message comprises at least one of: identification (ID) information of a partial protocol data unit (PDU) session to be set up at the distributed node and information of a partial quality of service (QOS) flow of a PDU session to be set up at the distributed node.

3. The method according to claim 1, wherein the step of receiving, by the distributed node, the session processing request message from the central node comprises:
   receiving, by the distributed node, a session modification request message from the central node;
   wherein the session modification request message comprises information of a partial QoS flow of a PDU session to be deleted from the distributed node.

4. The method according to claim 1, wherein the step of receiving, by the distributed node, the session processing request message from the central node comprises:
   receiving, by the distributed node, a session deletion request message from the central node;
   wherein the session deletion request message comprises ID information of a partial PDU session to be deleted from the distributed node.

5. The method according to claim 1, wherein the multiple distributed nodes comprise a target node and the step of receiving, by the distributed node, the session processing request message from the central node comprises:
   receiving, by the target node, a first session migration command message from the central node, wherein the first session migration command message comprises at least one of ID information of a partial PDU session to be migrated to the target node and information of a partial QoS flow of a PDU session to be migrated to the target node.

6. The method according to claim 5, wherein the multiple distributed nodes comprise an original node and the step of receiving, by the distributed node, the session processing request message from the central node comprises:
   receiving, by the original node, a second session migration command message from the central node, wherein the second session migration command message comprises at least one of ID information of a partial PDU session to be migrated from the original node and information of a partial QoS flow of a PDU session to be migrated from the original node.

7. The method of claim 5, wherein the multiple distributed nodes comprises an original node and the method further comprises:
   sending, by the original node, a session migration request message to the central node, wherein the session migration request message comprises at least one of ID information of a partial PDU session requested to be migrated from the original node and information of a partial QoS flow of a PDU session requested to be migrated from the original node.

8. A session processing apparatus, comprising a processor and a memory; wherein
   the memory is configured to store instructions; and
   the processor is configured to read the instructions to implement the method according to claim 1.

9. A network device, comprising: a processor and a memory; wherein
   the memory is configured to store instructions; and
   the processor is configured to read the instructions to implement the method according to claim 1.

10. A non-transitory storage medium, wherein the storage medium has a computer program stored thereon which, when executed by a processor, causes the method according to claim 1.

11. A session processing method, comprising:
    sending, by a central node, a session processing request message to a distributed node, the session processing request message comprising information of a partial session to be processed of one session at the distributed node, wherein the central node is connected to multiple distributed nodes comprising the distributed node, and the multiple distributed nodes comprise a Next Generation Radio Access Network (NG-RAN) node, a satellite-RAN node, and an Evolved Universal Terrestrial Radio Access Network (EUTRAN) node;

wherein the session processing request message is configured to instruct the distributed node receiving the session processing request message to process the partial session with a UE according to the information of the partial session to be processed, and wherein the one session comprises a plurality of partial sessions, and the plurality of partial sessions are to be processed in at least two of the multiple distributed nodes, respectively.

12. The method according to claim 11, wherein the step of sending, by the central node, the session processing request message to the distributed node comprises:

sending, by the central node, a session setup request message to the distributed node, wherein the session setup request message comprises at least one of ID information of a partial Protocol Data Unit (PDU) session to be set up at the distributed node and information of a partial quality of service (QOS) flow of a PDU session to be set up at the distributed node; and the session setup request message is configured to instruct the distributed node receiving the session setup request message to set up at least one of the partial PDU session with the UE and the partial QoS flow of the PDU session with the UE.

13. The method according to claim 11, wherein the step of sending, by the central node, the session processing request message to the distributed node comprises:

sending, by the central node under the condition that a partial QoS flow of a PUD session at the distributed node needs to be deleted, a session modification request message to the distributed node;

wherein the session modification request message comprises information the partial QoS flow of the PDU session to be deleted from the distributed node; and the session modification request message is configured to instruct the distributed node receiving the session modification request message to delete the partial QOS flow of the PDU session.

14. The method according to claim 11, wherein the step of sending, by the central node, the session processing request message to the distributed node comprises:

sending, by the central node under the condition that all QoS flows of a partial PUD session at the distributed node need to be deleted, a session deletion request message to the distributed node;

wherein the session deletion request message comprises ID information of the partial PDU session to be deleted from the distributed node; and the session deletion request message is configured to instruct the distributed node receiving the session deletion request message to delete all QoS flows of the partial PDU session with the UE.

15. The method according to claim 11, wherein the multiple distributed nodes comprise a target node and the step of sending, by the central node, the session processing request message to the distributed node comprises:

sending, by the central node, a first session migration command message to the target node;

wherein the first session migration command message comprises at least one of ID information of a partial PDU session to be migrated to the target node and information of a partial QoS flow of a PDU session to be migrated to the target node;

the first session migration command message is configured to instruct the target node to set up at least one of the partial PDU session with the UE and the partial QoS flow of the PDU session with the UE; or to modify the partial QoS flow of the PDU session with the UE.

16. The method according to claim 15, wherein the multiple distributed nodes comprise an original node and the step of sending, by the central node, the session processing request message to the distributed node comprises:

sending, by the central node, a second session migration command message to the original node; wherein the second session migration command message comprises at least one of ID information of a partial PDU session to be migrated from the original node and information of a partial QoS flow of a PDU session to be migrated from the original node;

the second session migration command message is configured to instruct the original node to modify the partial QoS flow of the PDU session with the UE; or to delete the partial PDU session with the UE.

17. The method according to claim 15, wherein the multiple distributed nodes comprise an original node and the method further comprises:

receiving, by the central node, a session migration request message from the original node;

wherein the session migration request message comprises at least one of ID information of a partial PDU session requested to be migrated from the original node and information of a partial QoS flow of a PDU session requested to be migrated from the original node.

18. A session processing apparatus, comprising a processor and a memory; wherein the memory is configured to store instructions; and the processor is configured to read the instructions to implement the method according to claim 11.

19. A network device, comprising: a processor and a memory; wherein the memory is configured to store instructions; and the processor is configured to read the instructions to implement the method according to claim 11.

20. A non-transitory storage medium, wherein the storage medium has a computer program stored thereon which, when executed by a processor, causes the method according to claim 11.

* * * * *